US008305242B2

(12) United States Patent
Yamasaki

(10) Patent No.: US 8,305,242 B2

(45) Date of Patent: Nov. 6, 2012

(54) INPUT DEVICE AND ELECTRONIC DEVICE PROVIDED WITH THE SAME

(75) Inventor: Takeshi Yamasaki, Tokyo (JP)

(73) Assignee: Alp Electric Co., Ltd., Tokyo (JP)

(*) Notice: Subject to any disclaimer, the term of this patent is extended or adjusted under 35 U.S.C. 154(b) by 373 days.

(21) Appl. No.: 12/731,022

(22) Filed: Mar. 24, 2010

(65) Prior Publication Data

US 2010/0176973 A1 Jul. 15, 2010

Related U.S. Application Data

(63) Continuation of application No. PCT/JP2008/067412, filed on Sep. 26, 2008.

(30) Foreign Application Priority Data

Oct. 2, 2007 (JP) ................................ 2007-258864

(51) Int. Cl.
*H03M 11/00* (2006.01)

(52) U.S. Cl. ......................................... 341/32; 345/161

(58) Field of Classification Search .................. 345/161, 345/159; 341/20, 32

See application file for complete search history.

(56) References Cited

U.S. PATENT DOCUMENTS 6,232,959 B1 * 5/2001 Pedersen ...................... 345/161
6,239,785 B1 * 5/2001 Wallace et al. ............... 345/156
6,266,046 B1 * 7/2001 Arita ............................ 345/156
6,606,085 B1 * 8/2003 Endo et al. .................... 345/161

FOREIGN PATENT DOCUMENTS

JP 2001-159953 6/2001
JP 2002-149256 5/2002
JP 2002-328733 11/2002
JP 2006-49015 2/2006

OTHER PUBLICATIONS

Search Report dated Nov. 4, 2008 for International Application No. PCT/JP2008/067412.

* cited by examiner

*Primary Examiner* — Brian Young

(74) *Attorney, Agent, or Firm* — Beyer Law Group LLP

(57) ABSTRACT

An input device with a hollow portion therein at a neutral position includes a return member capable of self-returning to the neutral position upon deformation, a magnetic member movable in three mutually-orthogonal axial directions accompanied with the deformation of the return member, and a plurality of magnetic sensors individually detecting the position of the magnetic member in the three axial directions with respect to the neutral position. The three-dimensional operation of the magnetic member may be easily detected by a simplified structure and the magnetic member is located with high accuracy.

17 Claims, 11 Drawing Sheets

44
30
46
40
31
22
70

INPUT DEVICE AND ELECTRONIC DEVICE PROVIDED WITH THE SAME

CLAIM OF PRIORITY

This application is a Continuation of International Application No. PCT/JP2008/067412 filed on Sep. 26, 2008, which claims benefit of the Japanese Patent Application NO. 2007-258864 filed on Oct. 2, 2007, both of which are hereby incorporated by reference.

BACKGROUND OF THE INVENTION

1. Field of the Invention

The present invention relates to an input device inputting position data and coordinate data into a computer, and an electronic device provided with the input device.

2. Description of the Related Art

The input device of the aforementioned type includes a magnetic member and a magnetic sensor, for example. The sensor detects the position of the magnetic member. The detection signal is analyzed by a computer so as to be used for various control operations.

Recently, an input device with compact structure has been desired so as to be adapted to a small-sized and lightweight electric device. Japanese Patent Application Publication No. 2006-49015 discloses the technology for reducing the size, especially the thickness of an input device.

The aforementioned input device includes two magnetic sensors and a switch. The magnetic sensors are configured to detect the position of the magnetic member in directions of X-axis and Y-axis among three mutually-orthogonal axes (X-axis, Y-axis, Z-axis).

Meanwhile, the switch is used to detect the position in the direction of Z-axis. The position of the magnetic member in the Z-axis direction may be detected on the basis of the amount of depressing the switch.

The above-described related art requires both the magnetic sensors and the switch for detecting the three-dimensional operation of the magnetic member, resulting in a complicated structure of the input device.

The use of the magnetic sensors and the switch for detecting the three-dimensional operation of the magnetic member may further complicate the process for locating the magnetic member, which causes a problem that the position of the magnetic member is not detected accurately. Locating the magnetic member requires the respective detection results of both the magnetic sensors and the switch to be analyzed together.

In the above-described related art, detecting the three-dimensional operation of the magnetic member only by the magnetic sensors is not considered in particular.

SUMMARY OF THE INVENTION

The present invention provides an input device with a simplified structure that detects a three-dimensional operation of a magnetic member, and an electronic device provided with the input device.

According to an embodiment of the present invention, there is provided an input device including a return member having space therein at a neutral position, and capable of self-returning to the neutral position after being deformed, a magnetic member movable in three mutually-orthogonal axial directions accompanied with the deformation of the return member, and a plurality of magnetic sensors detecting the position of the magnetic member in the three axial directions with respect to the neutral position.

According to the embodiment, the input device includes a return member, a magnetic member, and a plurality of magnetic sensors. The return member has the space at a neutral position thereof and is self-returnable to the neutral position after being deformed. The magnetic member is movable in three mutually-orthogonal axial directions in response to deformation of the return member. The plurality of magnetic sensors respectively detect the position of the magnetic member in the three axial directions with respect to the neutral position.

That is, only the magnetic sensors detect the position of the magnetic member in all the three axial directions. Unlike the generally employed case where the position is detected by the magnetic sensors and the switch, the input device according to the embodiment has a simplified structure to detect the three-dimensional operation of the magnetic member without requiring the switch.

In the case where the three-dimensional operation of the magnetic member is detected by the magnetic sensors and the switch, results detected by both the magnetic sensors and the switch have to be analyzed in order to locate the magnetic member. According to the embodiment, the magnetic member may be located using the results detected by the magnetic sensors of the same kind of device. This prevents the process for locating the magnetic member from being complicated, thus improving the accuracy of locating the magnetic member.

According to the embodiment, the return member may include a reception hole at its top portion. The input device further includes an operation member fitted with an opening of the reception hole to protrude from the return member and movably supporting the magnetic member at an inner side of the return member.

The input device may further include the operation member which protrudes from an elastic member with the reception hole formed in the top portion. The operation member is structured to movably support the magnetic member at the inner side.

The operation member is fitted with the opening of the reception hole. Movement of the operation member, that is, movement of the magnetic member immediately causes the elastic member to be deformed, which renders the operator the intuitive sense of operating the device.

As described above, only the magnetic member and the magnetic sensors are required for locating the magnetic member. Unlike the generally employed case, the interface structure may be simplified, thus allowing the operation member to be easily diversified.

The input device may further include a sheet member inside the space, on which the magnetic sensors are mounted. The operation member may include a grip portion gripped by an operator, and a support portion extending inside the grip portion toward the magnetic sensors and having a leading end supporting the magnetic member attached thereto. Preferably, a peripheral wall of the support portion faces the reception hole, and the magnetic member is disposed in the hollow portion.

As described above, the input device includes the sheet member provided with a plurality of magnetic sensors. Meanwhile, the operation member includes the grip portion and the support portion. The support portion is inserted from the reception hole toward the sheet member so that the peripheral wall of the support portion faces the reception hole. The magnetic member is then disposed inside the space to reduce the distance from the magnetic member to each magnetic sensor, allowing the position of the magnetic member to be detected with high accuracy.

Preferably, the magnetic member is disposed between the reception hole and the sheet member. As the magnetic member is disposed between the reception hole and the sheet member inside the space, the "pull" operation of drawing the grip portion toward the operator, and the "push" operation of bringing the grip portion away from the operator may be performed to avoid the contact between the magnetic member and the elastic member, or between the magnetic member and the magnetic sensors, thus causing the life of the input device to be long.

Preferably, among the magnetic sensors, the sensor detecting a position of the magnetic member in a height direction of the device is disposed on substantially a same axis as that of the magnetic member.

Preferably, the sensor detecting the position of the magnetic member in the height direction of the device is disposed on the axis substantially the same as that of the magnetic member. This makes it possible to reduce the size of the sheet member. Unlike the case where the sensor is disposed at a position other than the position on the axis of the magnetic member, the present invention requires no correction, and improves the accuracy of detecting the position of the magnetic member in the height direction.

Preferably, among the magnetic sensors, the sensor detecting the position of the magnetic member in a longitudinal direction of the device is disposed in a plane including an axis in the height direction, and the magnetic sensor detecting the position of the magnetic member in a width direction of the device is disposed in a plane including an axis in the longitudinal direction.

As the sensors are individually disposed in the longitudinal, width, and height directions of the device, the three-dimensional operations of the magnetic member, that is, horizontal, vertical and turning directions may be fully detected.

The input device may further include a shield member which encloses the return member and shields magnetic field lines. In this way, the input device further includes the shield member which encloses the return member and shields the magnetic field lines. The external magnetic field lines directed inward of the return member may be shielded, thus further improving the accuracy of detecting the position of the magnetic member performed by each magnetic sensor.

The input device may be provided with a light emitting member mounted on the sheet member and internally illuminating the return member such that the light emitting member illuminates the inside of the return member. Accordingly, the input device may serve as an interior accessory and the position thereof may be easily detected.

The elastic member may be used as the return member, which requires no self-returnable part. The structure of the input device may be simplified and compact.

Moreover, the above-structured input device is employed for the electronic device according to an embodiment of the present invention so as to allow the magnetic sensors alone to detect the three-dimensional operation of the magnetic member for accurately locating the magnetic member. This makes it possible to improve reliability of the electronic device.

DESCRIPTION OF THE PREFERRED EMBODIMENT

Figure 1:
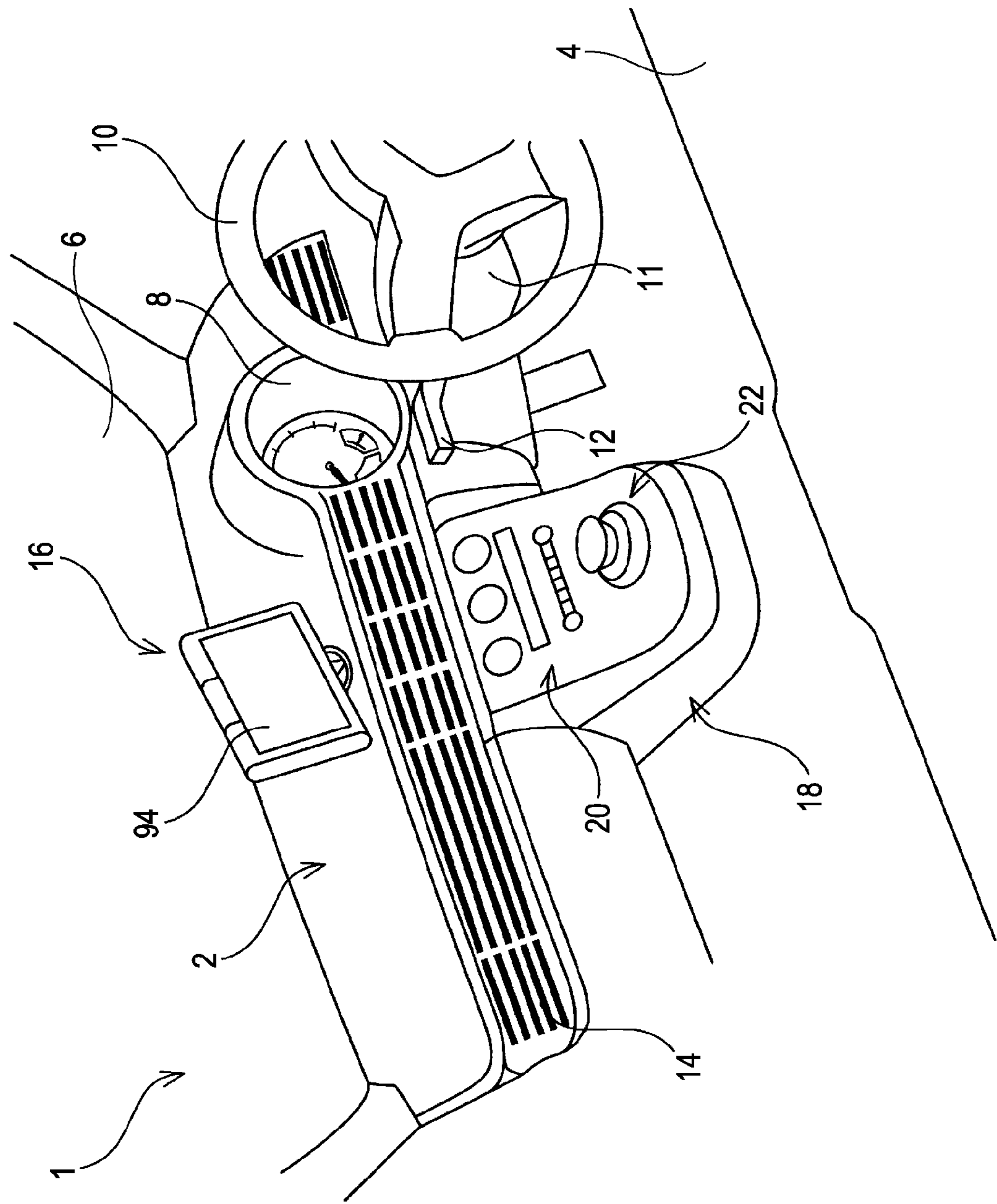
FIG. 1 is a view illustrating an input device according to an embodiment installed in a vehicle.

A preferred embodiment of the present invention will be described referring to the drawings.

FIG. 1 illustrates a driver's seat and a front passenger seat of a vehicle 1. An instrument panel 2 is disposed across a width of the vehicle in front of seats 4. There is a windshield 6 to the front of the panel 2, through which an occupant seated on the seat looks over the front view along passage of the vehicle 1.

Instruments 8 for displaying the speed, mileage, shift position and the like of the vehicle 1 are arranged on the front surface of the panel 2 in front of the driver's seat. A steering wheel 10 is turnably attached to a leading end of a shaft 11 extending from the lower portion of the panel 2 toward the seat 4. A shift lever 12 is attached to the peripheral wall of the shaft 11 so as to be movable up and down. The lever 12 extends toward the front passenger seat.

Plural outlets 14 are formed in the front surface of the panel 2 for feeding air from the air conditioning system to the interior of the vehicle 1.

In the embodiment, a monitor 16 is disposed on the upper surface of the panel 2 located between the driver's seat and the front passenger seat. The monitor 16 constitutes a car navigation device (electronic device) 80 to be described later. A display screen 94 of the monitor is structured to display maps, operation menus, and the like accompanied with activation of the device 80. The monitor 16 may be buried in the panel 2 at the appropriate position.

Referring to the drawing, a center console 18 is disposed between the driver's seat and the front passenger seat. The console 18 extends from the position below the instrument panel 2 toward the seats 4. An operation unit 20 for such equipment as the air-conditioning system and an audio system is provided on the console 18 in the vicinity of the outlets 14.

An analogue 3D input device (input device) 22 is provided on the console 18 at an appropriate position close to the seats 4. The input device 22 also constitutes the car navigation device 80, which enables various operations accompanied with activation of the device 80.

Figure 2:
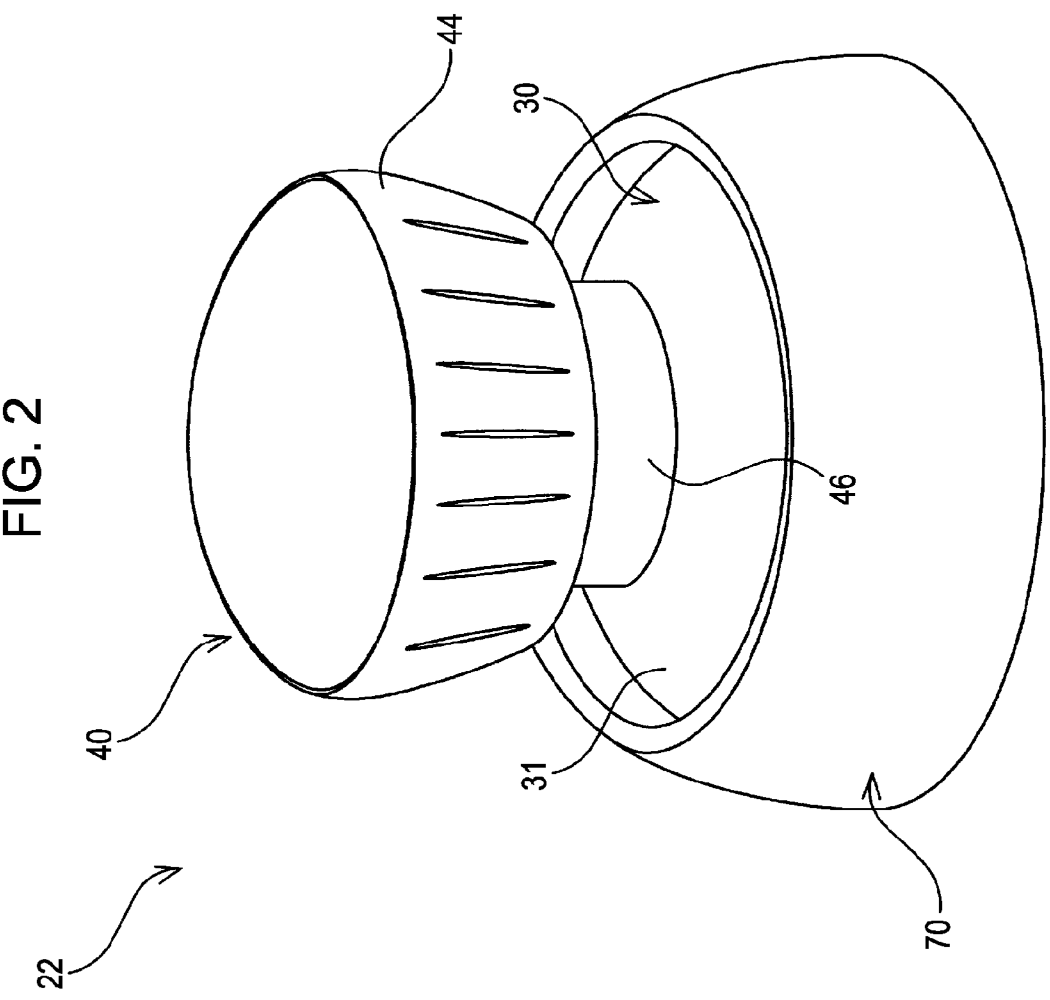
FIG. 2 is a perspective view illustrating an outer appearance of the input device shown in FIG. 1.
Figure 3:
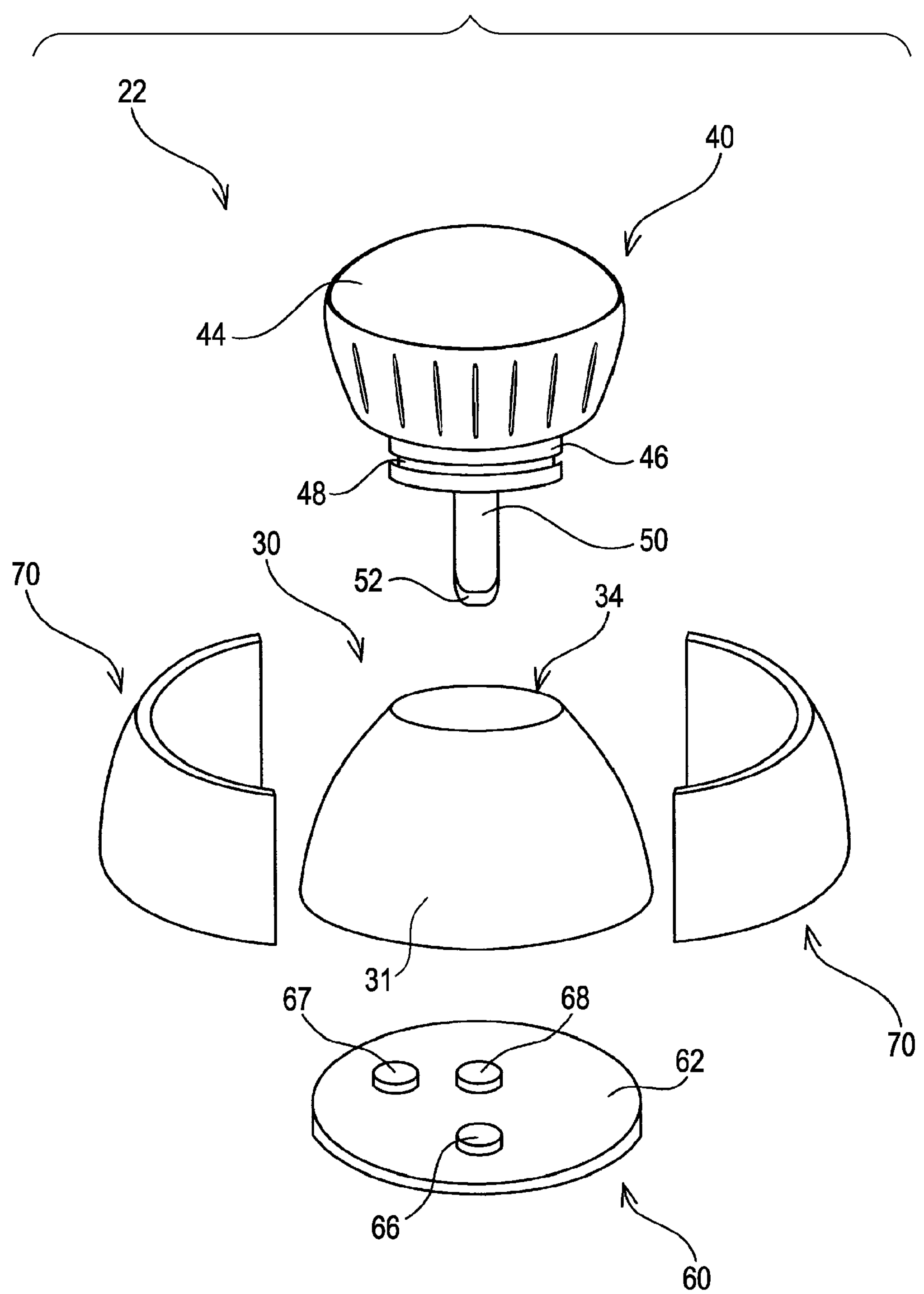
FIG. 3 is an exploded perspective view of the input device shown in FIG. 1.
Figure 4:
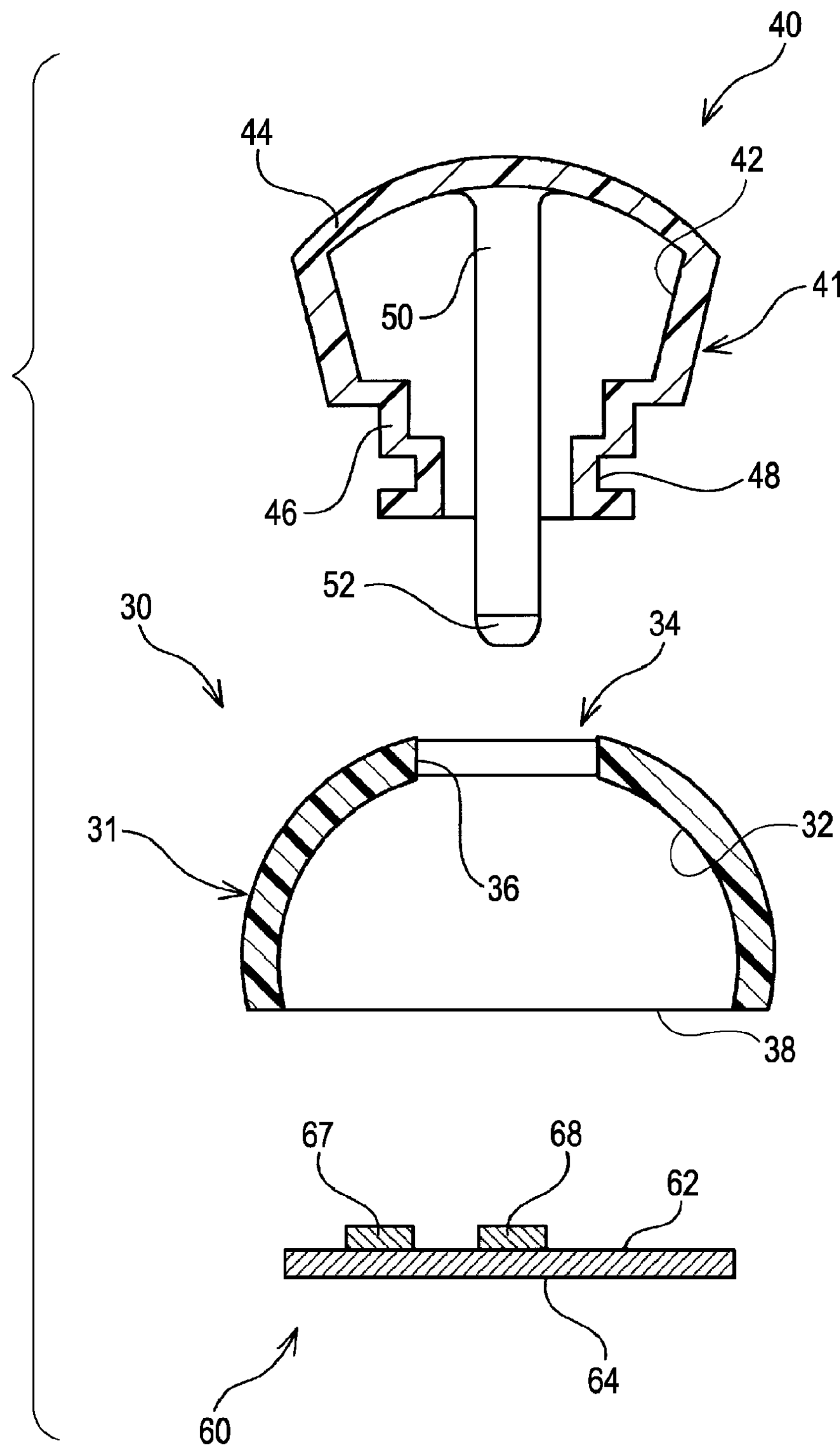
FIG. 4 is a partial sectional view of the input device shown in FIG. 1.

More specifically, the input device 22 according to the embodiment includes an elastic member (return member) 30 as illustrated in the perspective view of the outer appearance shown in FIG. 2, the exploded perspective view shown in FIG. 3, and the partial sectional view shown in FIG. 4. The elastic member 30 of the embodiment is formed of a synthetic rubber such as elastomer and silicone rubber.

The elastic member 30 has a dome-like main body 31 formed as substantially a hemispherical shape with a truncated portion, and disposed having the truncated portion directed upward (FIGS. 3, 4). Specifically, the main body 31 with flexibility is structured to have a predetermined thickness for generating repulsion upon deformation of the main body. The main body has a substantially hemispherical hollow portion (space) 32.

A reception hole 34 is formed in the top portion of the dome-like main body 31 so as to penetrate from outer side to the hollow portion 32 of the main body 31. That is, the hollow portion 32 and a bottom portion 38 are structured to be viewed from outside via an opening 36.

The elastic member 30 has the outer periphery thereof enclosed with a magnetic shield member (shield member) 70 formed of an alloy, for example, permalloy or the like (FIGS. 2, 3), and is structured to prevent the magnetic field lines generated in the vehicle 1, for example, a speaker therein from entering the hollow portion 32.

The elastic member 30 according to the embodiment is disposed at a neutral position as shown in FIGS. 2 to 4, in other words, at the default or reference position, and includes substantially the hemispherical hollow portion 32 inside the dome-like main body 31. The main body 31 is deformed accompanied with an operation member 40. After deformation of the main body 31, the elastic member self-returns toward the neutral position so as to bring the operation member 40 into the original position.

The operation member 40 is disposed above the elastic member 30. Specifically, the operation member 40 includes a cup-like main body 41 having its diameter gradually reduced toward the elastic member 30 (FIG. 4), and is formed of a resin, for example. The main body 41 includes a grip portion 44, an engagement portion 46 and a support portion 50. The grip portion 44 is placed at the top of the cup-like main body 41, and is shaped to be gripped by an operator of the input device 22.

The engagement portion 46 is connected to a lower end of the grip portion 44, extending toward the elastic member 30. A groove 48 is formed at an appropriate position of the engagement portion 46, while being recessed toward the axial center of the main body 41 in the peripheral wall of the engagement portion 46. The groove 48 is slightly smaller than the opening 36 of the reception hole 34 when seen from the thickness direction, and is slightly larger in the radial direction. The groove 48 and the opening 36 are tightly fitted with each other so as to transfer the force generated in the operation member 40 to the elastic member 30 immediately.

The cup-like main body 41 has a predetermined thickness as illustrated in FIG. 4. Space 42 is formed inside the grip portion 44 and the engagement portion 46, and accommodates the support portion 50 therein.

Specifically, the support portion 50 according to the embodiment is formed as a solid rod extending toward the elastic member 30 in alignment with the axial center of the main body 41. The length of the support portion 50 is longer than the height of the operation member 40. More specifically, when the groove 48 is fitted with the opening 36 to extend the operation member 40 above the elastic member, the support portion 50 is inserted from the reception hole 34 to reach the hollow portion 32.

The upper end of the support portion 50 is joined with the back surface of the grip portion 44, and the lower end (leading end) has a magnet (magnetic member) 52 attached thereto.

That is, in the embodiment, the magnet 52 is supported by the operation member 40 and is three-dimensionally movable along the direction of the operation member 40 moved by the operator in the hollow portion 32, more specifically, movable between the reception hole 34 and a base 60. The position of the magnet 52 with respect to the neutral position is detected by three sensors 66, 67 and 68.

The magnetic sensors 66 to 68 are disposed on the base (sheet member) 60 with a circular shape. Specifically, the base 60 is enclosed with the dome-like main body 31 close to the bottom portion 38. The base 60 includes a pulled substrate and a land (not shown), and an upper surface 62 on which each of the sensors 66 to 68 is mounted.

Meanwhile, a lower surface 64 of the base 60 is mounted on a wiring substrate (not shown) with a predetermined circuit pattern. The wiring substrate will be exposed in the vehicle 1 when removing the input device 22 from the center console 18.

Each of the sensors 66 to 68 according to the embodiment is structured to have only a specific axial direction detectable so as to locate the magnet 52 in three mutually-orthogonal axial directions (X-axis, Y-axis, and Z-axis).

The sensors 66 to 68 individually detect the distance from the magnet 52 to the sensors 66 to 68 and use a linearly proportional relationship between the detected distance and the magnetic force. Specifically, in accordance with the nature that the shorter the distance from the magnet 52 becomes, the larger the magnetic force becomes, each of the sensors 66 to 68 detects the magnitude and direction of the magnetic field lines from the magnet 52, and determines the distance between each of the sensors 66 to 68 and the magnet 52.

More specifically, as illustrated in FIG. 3, the Z-axis directional sensor 68 is disposed at the center of the upper surface 62 in the embodiment. The sensor 68 is structured to be capable of detecting the position of the magnet 52 in the height direction of the input device 22. The sensor 68 according to the embodiment is disposed on the axial center of the support portion 50 at the neutral position, in other words, the same axis as that of the magnet 52 at the neutral position.

The X-axis directional sensor 66 is disposed in the plane including the axis (Z-axis) in the height direction, and in the embodiment, it is disposed on the upper surface 62. The sensor 66 is structured to be capable of detecting the position of the magnet 52 in the longitudinal direction of the input device 22, that is, the longitudinal direction of the vehicle 1. Meanwhile, the Y-axis directional sensor 67 is disposed on the upper surface 62 in the plane including the longitudinal axis (X-axis), and is structured to be capable of detecting the position of the magnet 52 in the width direction of the input device 22, that is, the width direction of the vehicle 1.

In this way, the respective sensors 66 to 68 detect the position of the magnet 52 in three axial directions with respect to the neutral position without contacting the magnet 52, which enables the turning operation of the magnet 52 to be detected. A known magnetic sensor, for example, such magneto-resistive effect element as a GMR (Giant Magneto-Resistive) element, an AMR (Anisotropic Magneto-Resistive) element, and a TMR (Tunneling Magneto-Resistive) element, or the hall element may be employed as each of the sensors 66 to 68.

Each electrode of the aforementioned sensors 66 to 68 is electrically coupled with the car navigation device 80 via a circuit pattern on the wiring substrate.

Figure 5:
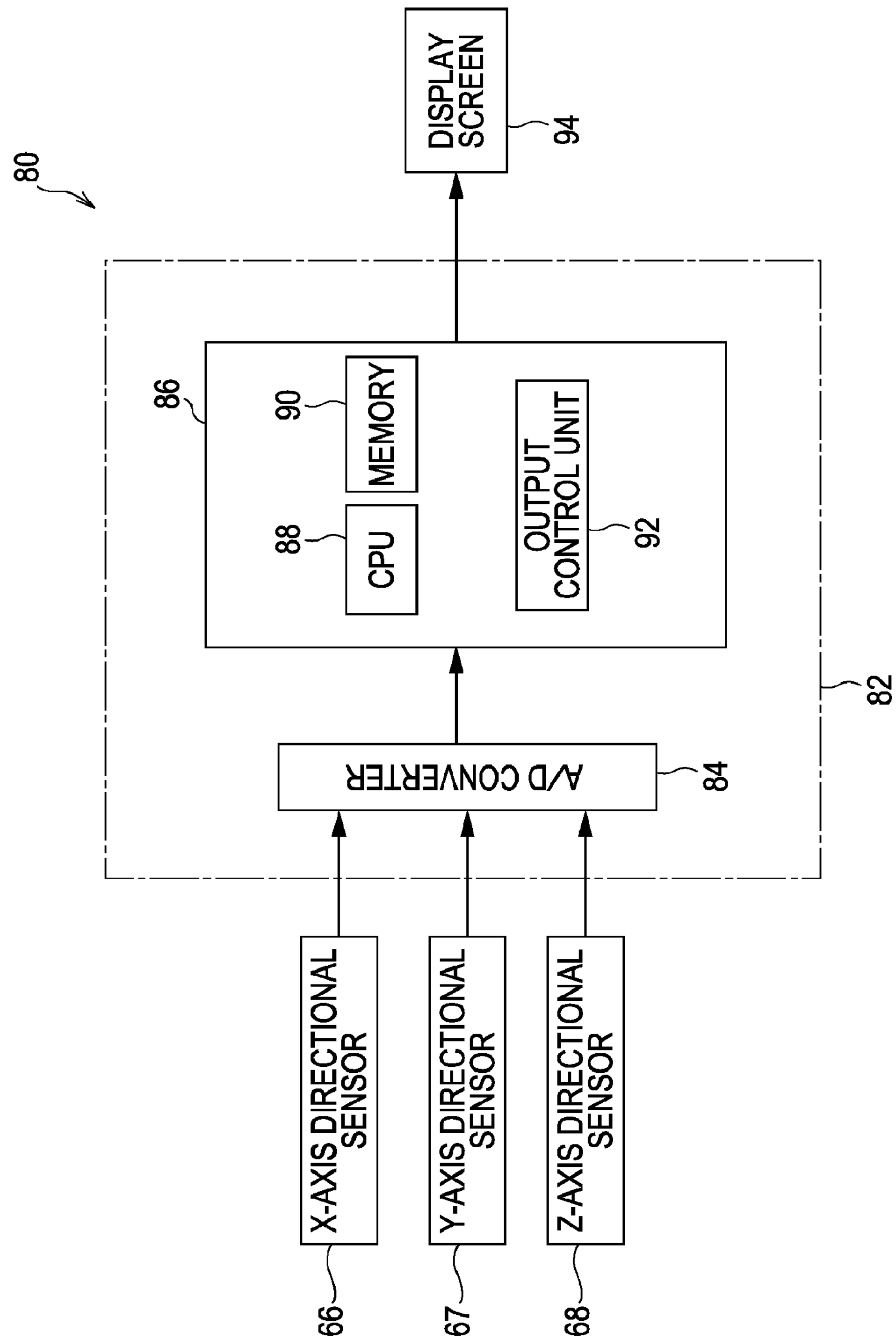
FIG. 5 is a block diagram illustrating control operation by an electronic device shown in FIG. 1.

Specifically, the car navigation device 80 according to the embodiment is provided with a control unit 82 which includes an A/D converter 84 and a controller 86 as illustrated in FIG. 5.

Analog signals corresponding to three axes are input into the A/D converter 84 from the respective sensors 66 to 68. The converter 84 converts the input signal into a digital signal and outputs the digital signal to the controller 86 via a single line, because the plural signals are required to be input to the controller 86 simultaneously for the purpose of the three-dimensional operation of the magnet 52.

The controller 86 includes a CPU 88, a memory 90 and an output control unit 92. The CPU 88 calculates the signal from the converter 84 real time. The output control unit 92 detects the distance between each of the sensors 66 to 68 and the magnet 52 to obtain the displacement of the magnet 52 from the neutral position to detect the current position. The obtained data are stored in the RAM of the memory 90.

A ROM of the memory 90 stores various control programs. The output control unit 92 executes a predetermined program based on the detected position of the magnet 52. The resultant signal is output to the display screen 94 of the monitor 16.

FIGS. 6 to 11 illustrate examples of the operation performed by the input device 22 according to the embodiment.

Figure 6:
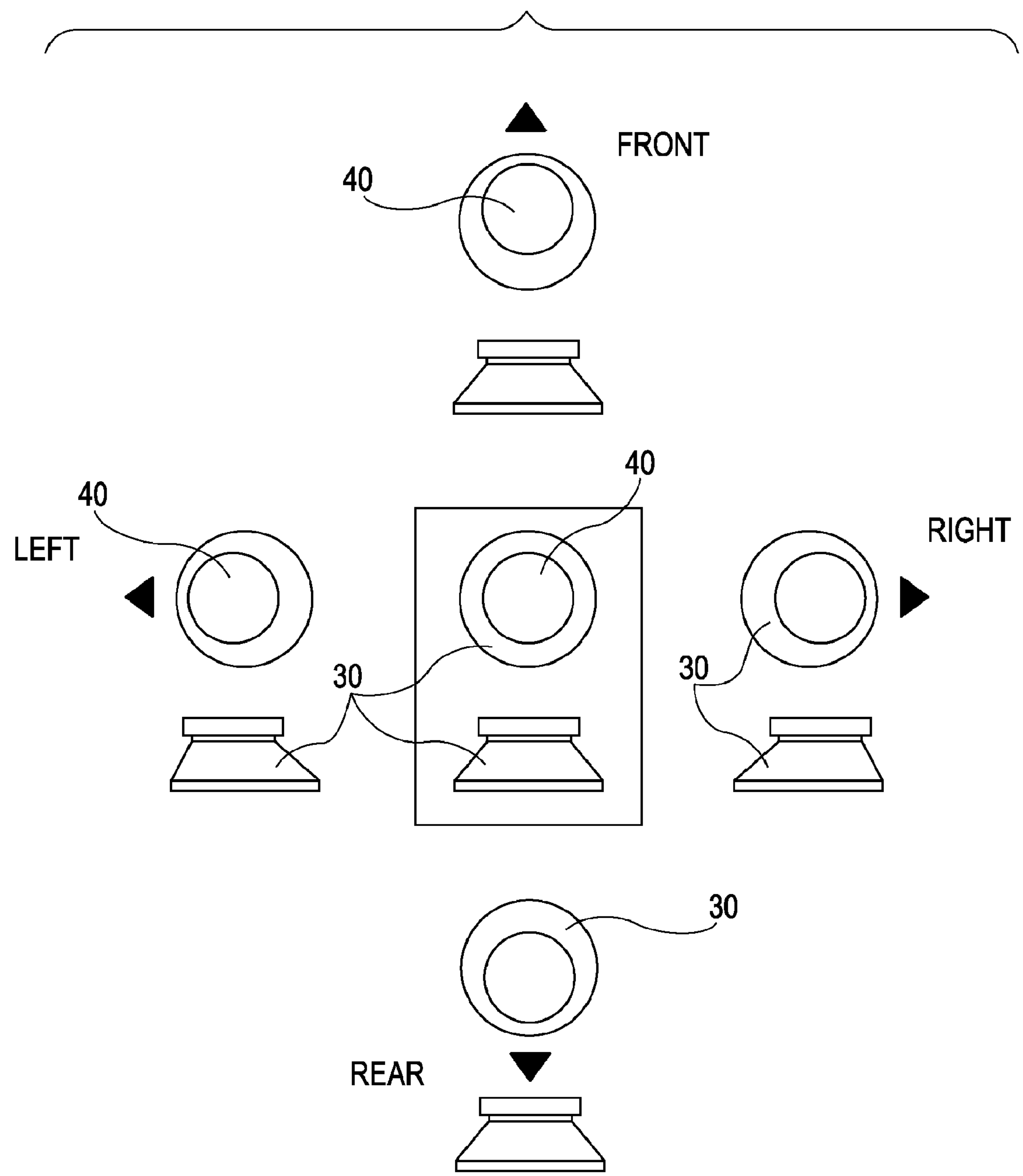
FIG. 6 is a view illustrating operations of the input device shown in FIG. 1.

FIG. 6 illustrates a horizontal scrolling operation, the center portion of which illustrates the operation member 40 enclosed with the frame and the elastic member 30 in the neutral position.

When the operator grips the grip portion 44 with his/her hand and applies the force to the operation member 40 toward the driver's seat, the elastic member 30 tilts to the right. Thereafter, when the grip 44 is released from the hand, the elastic member 30 rebounds to the left and returns to the neutral position.

Figure 7A:
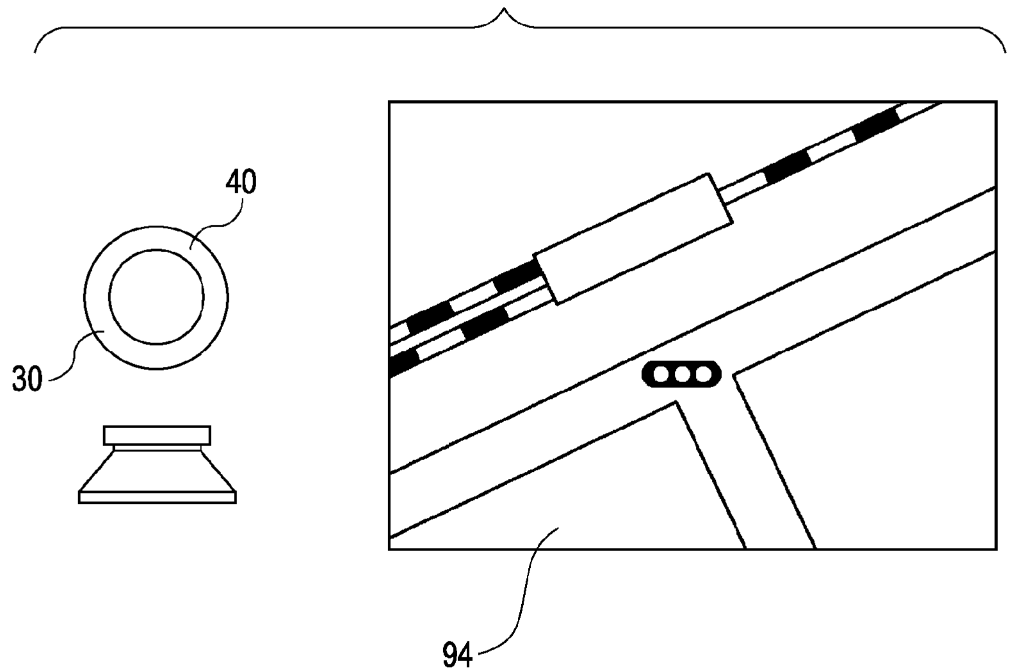
FIGS. 7A and 7B illustrate horizontal scrolling operations among those shown in FIG. 6.
Figure 7B:
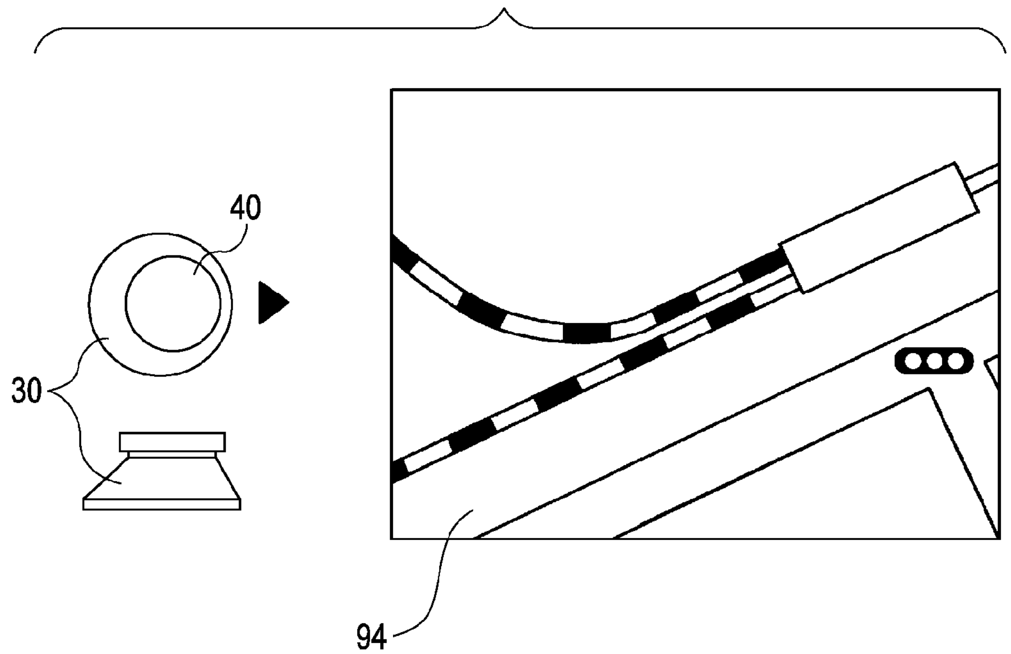

Specifically at the neutral position, the center of the display screen 94 coincides with the area around the T-shaped intersection where the traffic light is located as illustrated in FIG. 7A.

When the operation member 40 is operated toward the driver's seat, the elastic member 30 tilts to the right, and the magnet 52 moves to the right simultaneously. Each of the sensors 66 to 68 detects the distance from the magnet 52. The output control unit 92 executes the horizontal scrolling program. That is, on the display screen 94 in this case, the center coincides with an area to the left of the T-shaped intersection in the horizontal direction (see FIG. 7B).

Thereafter, when the grip portion 44 is released from the hand, the elastic member 30 rebounds to the left. The operation member 40 and the elastic member 30 return to the neutral position as shown in FIG. 7A. However, the center of the display screen 94 remains at the position shown in FIG. 7B, the position being the reference position for the subsequent operation.

The other horizontal scrolling operations are performed in the same way. When the force is applied to the operation member 40 toward the front of the vehicle 1 as illustrated in FIG. 6, the elastic member 30 tilts to the front. On the display screen 94 in this case, the center coincides with an area downward in the horizontal direction.

Meanwhile, when the force is applied to the operation member 40 toward the front passenger seat, the elastic member 30 tilts to the left, and the center of the display screen 94 coincides with an area to the right in the horizontal direction. When the force is applied to the operation member 40 toward the rear of the vehicle 1, the elastic member 30 tilts to the rear, and the center of the display screen 94 coincides with an area upward in the horizontal direction.

In any of the aforementioned operations, upon releasing the grip portion 44 from the hand, the elastic member 30 rebounds and causes the operation member 40 and the elastic member 30 to be in the neutral position.

Figure 8:
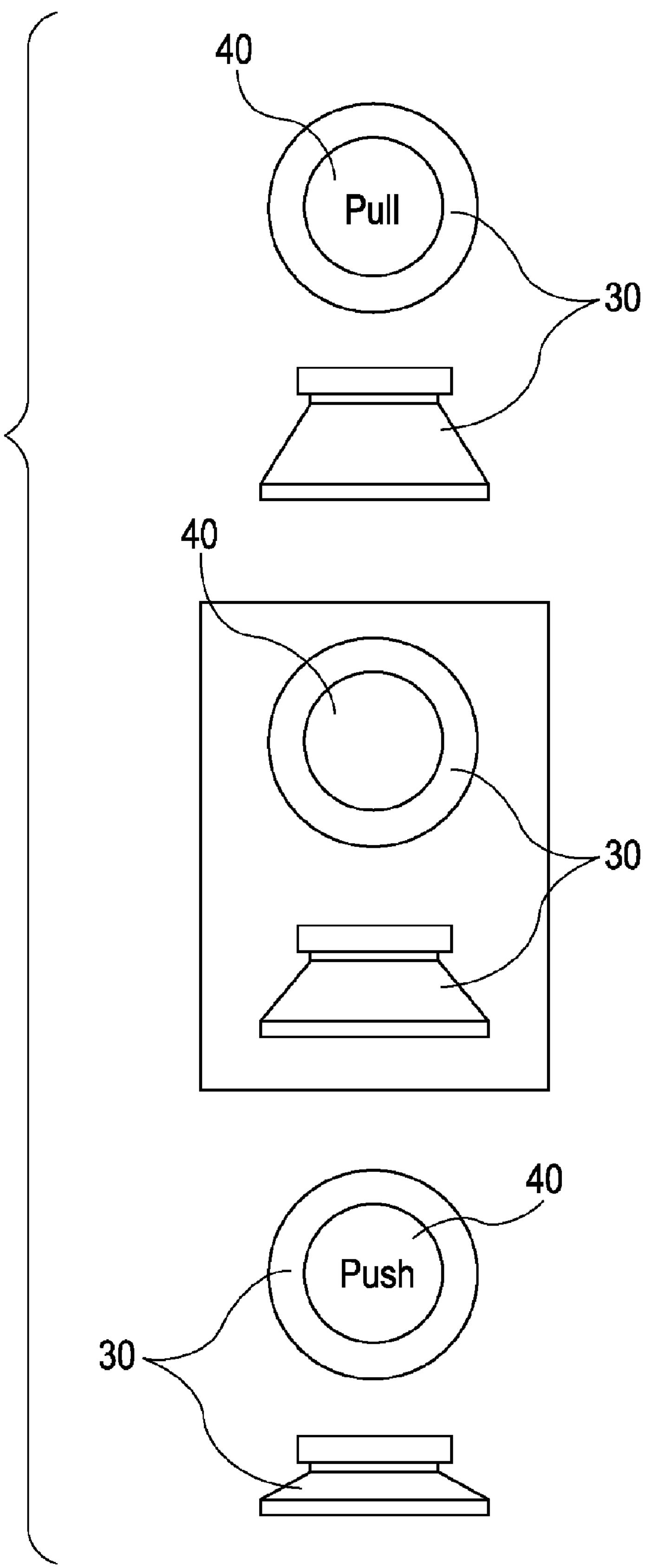
FIG. 8 is a view illustrating another operation of the input device shown in FIG. 1.

FIG. 8 illustrates the scale-up/scale-down operation, the center portion of which illustrates the operation member 40 enclosed with the frame and the elastic member 30 in the neutral position.

In this case, when the operator grips the grip portion 44 with the hand, and applies the force to the operation member 40 upward in the vehicle 1, the elastic member 30 extends upward. Thereafter, when the grip portion 44 is released from the hand, the elastic member 30 rebounds downward, and returns to the neutral position.

Figure 9A:
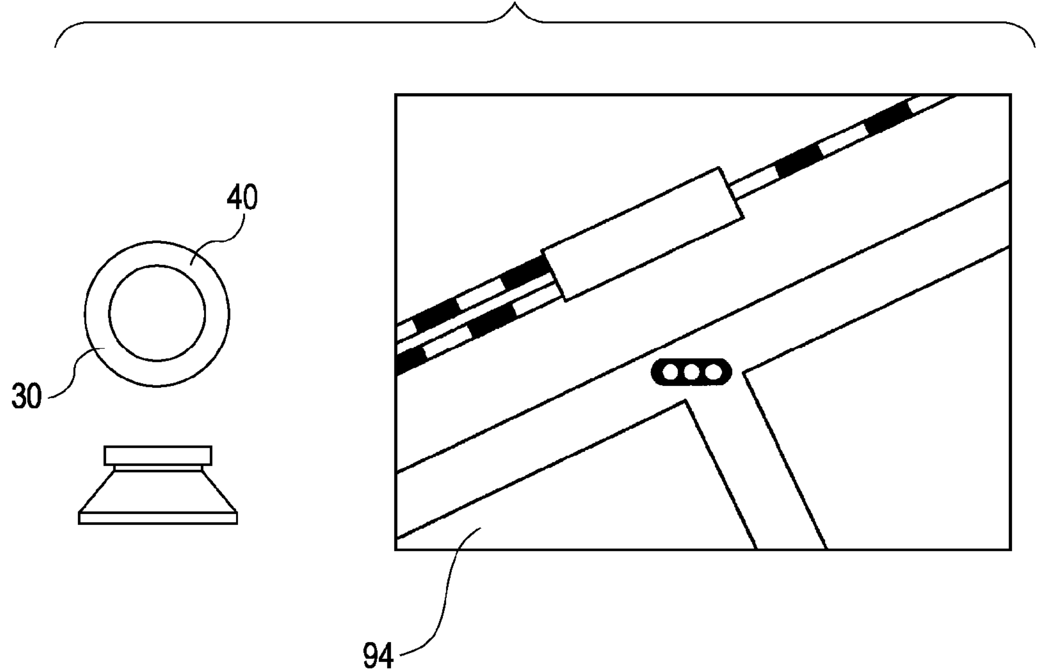
FIGS. 9A and 9B illustrate contracting operations among those shown in FIG. 8.

More specifically, at the neutral position, the display screen 94 displays only the region around the T-shaped intersection in front of the station as illustrated in FIG. 9A.

Figure 9B:
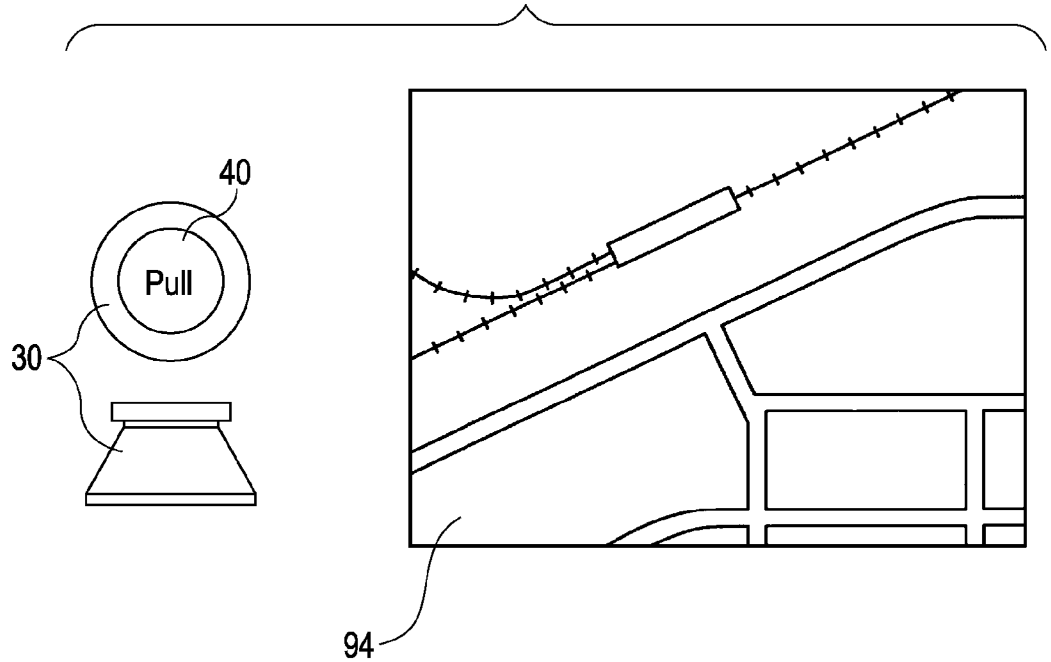

When the operation member 40 is pulled up toward the ceiling of the vehicle 1, the elastic member 30 extends upward, and the magnet 52 also moves up. The sensors 66 to 68 individually detect the distance from the magnet 52 to the sensors 66 to 68, and the output control unit 92 executes the program for scale-down display. That is, the overhead view including the area peripheral to the T-shaped intersection is displayed on the display screen 94 (FIG. 9B).

Thereafter, when the grip portion 44 is released from the hand, the elastic member 30 rebounds downward. The operation member 40 and the elastic member 30 return to the neutral position as shown in FIG. 9A. Meanwhile, the display screen 94 continues to display the area with the scale illustrated in FIG. 9B, the scale being the reference for the subsequent operation.

The scale-up display is performed in the same way. Referring to FIG. 8, when the operation member 40 is pushed toward the floor of the vehicle 1, the elastic member 30 contracts downward. The detailed view is displayed on the display screen 94 this time. In this case, when the grip portion 44 is released from the hand, the elastic member 30 rebounds, and both the operation member 40 and the elastic member 30 return to the neutral position.

Figure 10:
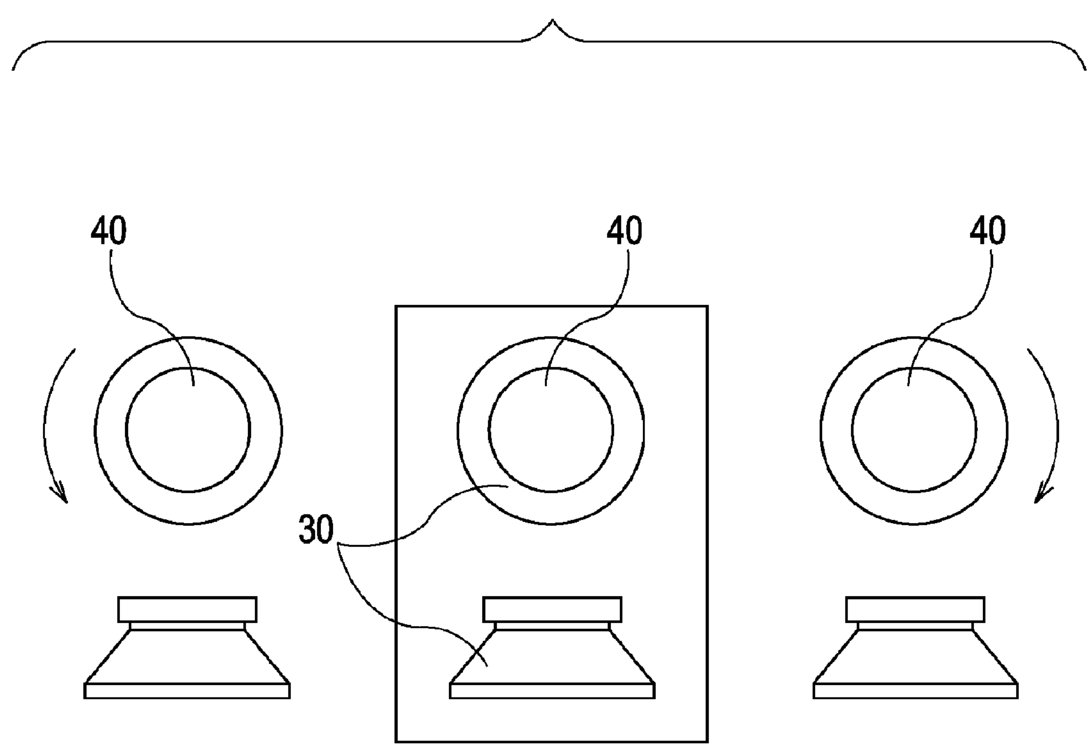
FIG. 10 is a view illustrating another operation of the input device shown in FIG. 1.

FIG. 10 illustrates an operation for displaying the operation menu. In this case, the grip portion 44 is gripped by the operator with the hand. When the force is applied to the operation member 40 so as to be turned clockwise, the elastic member 30 also turns clockwise. Thereafter, when the grip portion 44 is released from the hand, the elastic member 30 rebounds counterclockwise, and returns to the neutral position.

Figure 11A:
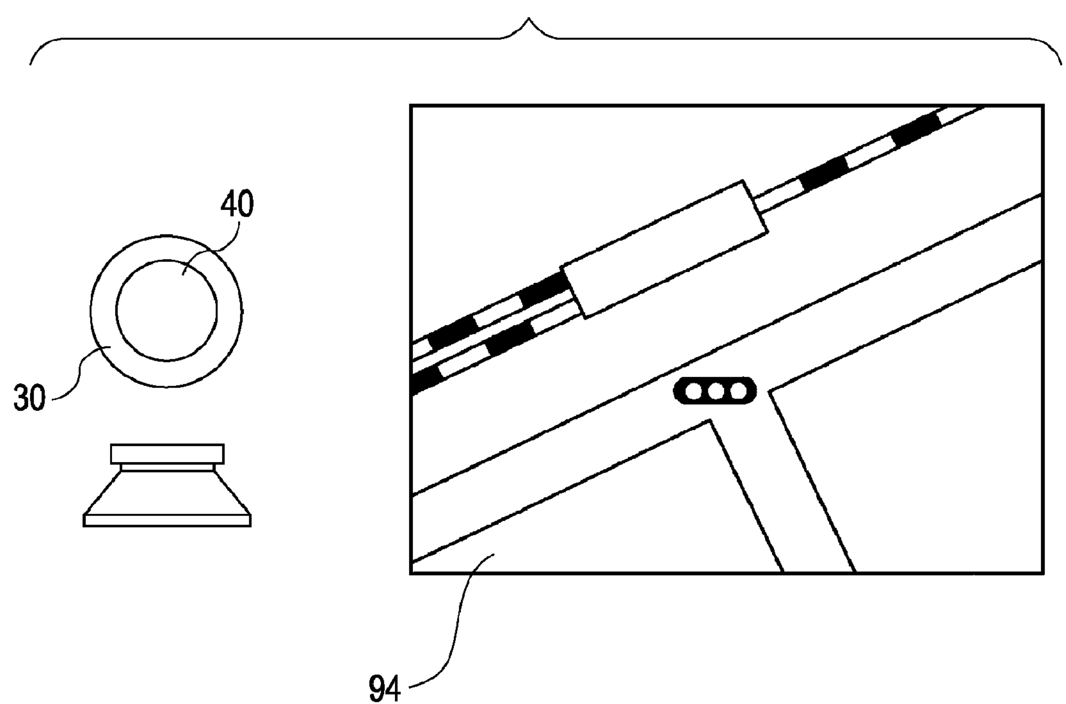
FIGS. 11A and 11B illustrate operations of displaying the menu among those shown in FIG. 10.

More specifically, the display screen 94 displays the T-shaped intersection in front of the station at the neutral position as illustrated in FIG. 11A.

Figure 11B:
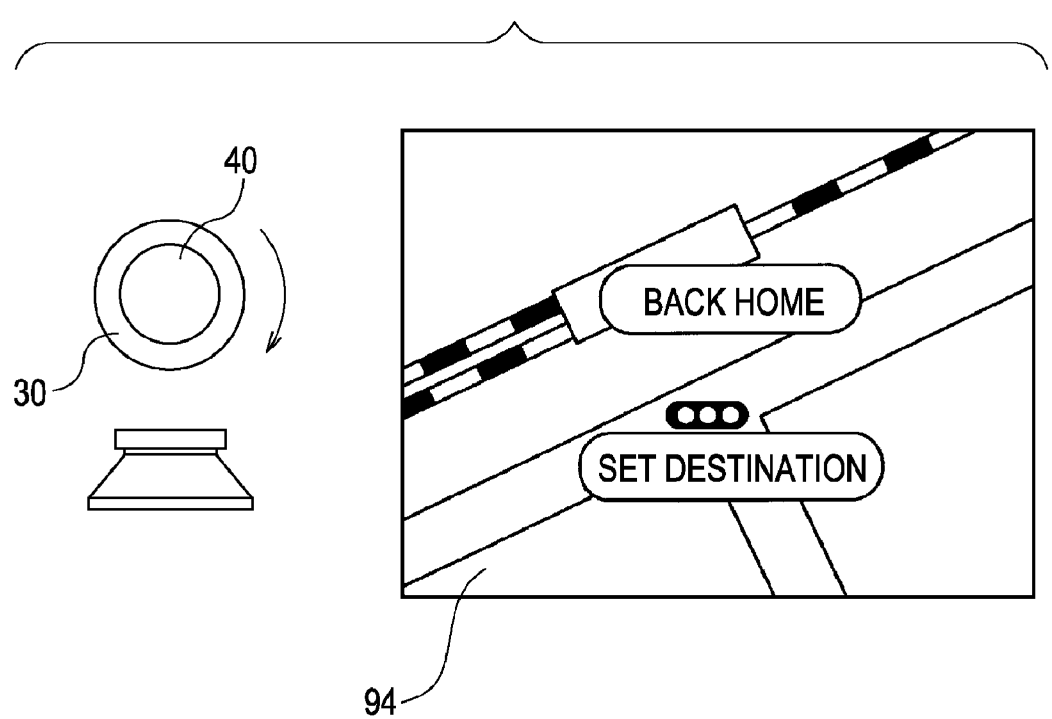

When the operation member 40 is turned clockwise when seen from above, the elastic member 30 also turns clockwise, and the magnet 52 turns clockwise simultaneously. The sensors 66 to 68 individually detect the distance from the magnet 52 to the sensors 66 to 68, and the output control unit 92 executes the program for displaying the menu. For example, the display screen 94 displays the menus "BACK HOME" and "SET DESTINATION" on the T-shaped intersection (FIG. 11B).

Assuming that the menu "BACK HOME" is selected, the grip 44 is released from the hand such that the elastic member 30 rebounds counterclockwise. The operation member 40 and the elastic member 30 then return to the neutral position. The force is applied to the operation member 40 toward the front or toward the rear of the vehicle 1 in the aforementioned state to invert the display color of the menu "BACK HOME".

After returning the operation member 40 and the elastic member 30 to the neutral position again, the operation member 40 is pushed toward the floor of the vehicle 1 to contract the elastic member 30 downward to select the menu "BACK HOME".

In the case where the selected menu is cancelled, the operation member 40 is turned counterclockwise when seen from above as illustrated in FIG. 10, causing the elastic member 30 to turn counterclockwise and the current menu to be cancelled.

In this way, with the car navigation device 80 provided with the input device 22, in response to the operator's operation on the operation member 40, the elastic member 30 deforms immediately. The displacement of the magnet 52 is detected by the respective sensors 66 to 68. Various views are displayed on the display screen 94 depending on the results analyzed by the controller 86.

The aforementioned input device 22 may be used as an interior accessory. For example, the elastic member 30 may be formed of a translucent material, and the LED (light emitting member) is mounted on the base 60 at the appropriate position to illuminate the inside of the elastic member 30. This allows the input device 22 to be used as the internally illuminated interior accessory.

According to the embodiment, the input device 22 includes the base 60, the elastic member 30, the operation member 40, the magnet 52, the three magnetic sensors 66 to 68, and the magnetic shield member 70.

The elastic member 30 has substantially a hemispherical hollow portion 32 therein at the neutral position so as to be self-returnable to the neutral position after being deformed. The magnet 52 is structured to be movable in any of three mutually-orthogonal axial directions (X-axis, Y-axis, and Z-axis) accompanied with the deformation of the elastic member 30. The three magnetic sensors 66 to 68 detect the position of the magnet 52 in the three axial directions with respect to the neutral position.

The position of the magnet 52 in all the three axial directions is detected only by the magnetic sensors 66 to 68. Unlike the generally employed case where the magnet position is detected by both the magnetic sensors and the switch, the detection in the embodiment requires no switch. Accordingly, unlike the related art, the three-dimensional operation of the magnet 52 may be detected with a simplified structure.

In the case where the magnet position in the Z-axis direction is detected by the switch similar to the related art, the magnet has to be located on the basis of the detection results of both the magnetic sensors and the switch. However, in the embodiment, the magnet 52 may be located using the results detected by the magnetic sensors 66 to 68, which are the same kind of device, rather than by different kinds of devices. This makes it possible to prevent the process for locating the magnet 52 from being complicated, and to improve the accuracy of locating the magnet 52.

The operation member 40 protrudes from substantially the hemispherical elastic member 30 having the truncated portion and movably supports the magnet 52 inside the hemispherical elastic member 30. The operation member 40 is tightly fitted with the opening 36 of the reception hole 34. The movement of the operation member 40, that is, the movement of the magnet 52 deforms the elastic member 30 immediately. This may render the operator the intuitive sense of operating the device.

More specifically, upon operator's pushing, pulling, tilting or twisting operation on the operation member 40, the resultant force feedback is obtained from the elastic member 30, thus giving the operator the sense of "actual operation".

As described above, the magnet 52 and the magnetic sensors 66 to 68 alone are needed for locating the magnet 52. Unlike the related art, the present invention simplifies the structure of the hardware interface, and easily diversifies the operation member 40.

Those three magnetic sensors 66 to 68 are disposed on the base 60, and the operation member 40 includes the grip portion 44 and the support portion 50. Upon insertion of the support portion 50 from the reception hole 34 toward the base 60, the peripheral wall of the support portion 50 faces the reception hole 34 such that the magnet 52 is disposed in the hollow portion 32. This may reduce the distance between the magnet 52 and each of the respective sensors 66 to 68, thus allowing the magnet 52 to be located with high accuracy.

As the magnet 52 is disposed between the reception hole 34 and the base 60 in the hollow portion 32, the grip portion 44 may be pulled toward the ceiling of the vehicle 1 and pushed toward the floor of the vehicle 1 as well. This makes it possible to move the magnet 52 in more directions, thus increasing the available range of the input device 22.

The magnet 52 suspended in the hollow portion 32 is movable without contacting the elastic member 30 and the magnetic sensors 66 to 68, which contributes to prolonged life of the input device 22. Without any noise caused by sliding operation of the magnet, its position may be detected with further high accuracy.

Among the magnetic sensors 66 to 68, the sensor 68 for detecting the position in Z-axis direction is disposed on substantially the same axis as that of the magnet 52, resulting in the compact base 60. Unlike the case where the sensor 68 is disposed at the position away from the axis of the magnet 52, the positional correction is not required, and accuracy of detecting the position in Z-axis direction may be improved.

As the respective sensors 66 to 68 are disposed in X-axis, Y-axis, and Z-axis directions, three-dimensional operation of the magnet 52 in the horizontal, vertical and turning directions may be reliably detected.

The magnetic shield member 70 encloses the elastic member 30 to shield magnetic field lines. The magnetic field lines intruding toward the hollow portion 32 of the elastic member 30 from outside may be shielded to further improve the accuracy of detecting the position of the magnet 52 by the sensors 66 to 68. This may prevent the magnetic field lines generated inside the hollow portion 32 from being discharged, thus contributing to the improvement in the accuracy of detecting the position.

If the elastic member 30 is internally illuminated with the LED, the input device 22 may serve as an interior accessory to be easily located even in the dark.

As the elastic member 30 eliminates the use of the self-returning part, the input device 22 may have a simplified and compact structure.

The three-dimensional operation of the magnet 52 may be accurately detected only by the aforementioned sensors 66 to 68 to improve reliability of the car navigation device 80. Specifically, the operator can perform desired operations through remote operation on the display screen 94 without touching the monitor 16 by hand. Unlike the case where the monitor 16 is directly touched, the operator's line of sight is as stable as possible and the vehicle may be driven safely.

In the case where the display screen 94 is remotely operated, the monitor 16 may be disposed at a position away from the driver's seat, thus allowing effective use of the space in the vehicle 1.

The present invention is not limited to the above-described embodiment, and may be modified into various forms without departing from the scope of the present invention.

For example, in the aforementioned embodiment, the elastic member 30 is formed separately from the operation member 40. However, both the members may be integrally formed without being limited to the aforementioned structure.

In the embodiment, the dome-like main body 31 is formed of the synthetic rubber material. However, the return member according to the present invention may be a coiled spring which has a upward-gradually-reduced coil diameter so long as it exhibits the repulsive force upon the deformation. Further, the main body may have an outer appearance of a polygonal pyramid such as a trigonal pyramid other than substantially the hemispherical shape so long as it has space therein.

In the embodiment, the magnet 52 is disposed in the hollow portion 32. This is an optimum structure. However, the magnet may be disposed around the upper surface 62. In this case also, the operation member in the upper half may be moved in the Z-axis direction, that is, pulled toward the ceiling of the vehicle 1.

In the embodiment, the magnet 52 is supported by the operation member 40. However, the operation member may be omitted. That is, the magnet may be supported by the elastic member. In this case, the magnet is moved by directly operating the elastic member. The aforementioned magnetic shield member 70 also may be omitted.

Any of the aforementioned cases has the effect of detecting the three-dimensional operation of the magnet with the structure more simplified than the related art.

The present invention is applied to the car navigation device as the electronic device in the embodiment. However, the present invention is applicable to an air-conditioning system or audio system as the electronic device as well as such device as a digital camera.

What is claimed is:

1. An input device comprising:

a return member having space therein at a neutral position, and capable of self-returning to the neutral position after being deformed;

a magnetic member movable in three mutually-orthogonal axial directions accompanied with the deformation of the return member; and a plurality of magnetic sensors detecting the position of the magnetic member in the three axial directions with respect to the neutral position, wherein the return member is an elastic member.

2. An input device comprising:

a return member having space therein at a neutral position, and capable of self-returning to the neutral position after being deformed;

a magnetic member movable in three mutually-orthogonal axial directions accompanied with the deformation of the return member; and a plurality of magnetic sensors detecting the position of the magnetic member in the three axial directions with respect to the neutral position, wherein the return member includes a reception hole at a top portion thereof, the input device further comprising:

an operation member that is fitted with an opening of the reception hole to protrude from the return member and movably supports the magnetic member at an inner side of the return member.

3. The input device according to claim 2, further comprising a sheet member inside the space, on which the magnetic sensors are mounted, wherein:

the operation member includes a grip portion gripped by an operator, and a support portion extending inside the grip portion toward the magnetic sensors and having a leading end supporting the magnetic member attached thereto; and a peripheral wall of the support portion faces the reception hole, and the magnetic member is disposed in the hollow portion.

4. The input device according to claim 3, wherein the magnetic member is disposed between the reception hole and the sheet member.

5. The input device according to claim 1, wherein among the magnetic sensors, the sensor detecting a position of the magnetic member in a height direction of the device is disposed on substantially a same axis as that of the magnetic member.

6. The input device according to claim 5, wherein:

among the magnetic sensors, the sensor detecting the position of the magnetic member in a longitudinal direction of the device is disposed in a plane including an axis in the height direction; and the magnetic sensor detecting the position of the magnetic member in a width direction of the device is disposed in a plane including an axis in the longitudinal direction.

7. The input device according to claim 1, further comprising a shield member that encloses the return member and shields magnetic field lines.

8. The input device according to claim 1, further comprising a light emitting member mounted on a sheet member and internally illuminating the return member.

9. The input device according to claim 2, wherein the return member is an elastic member.

10. An electronic device that includes an input device comprising:

a return member having space therein at a neutral position, and capable of self-returning to the neutral position after being deformed;

a magnetic member movable in three mutually-orthogonal axial directions accompanied with the deformation of the return member; and a plurality of magnetic sensors detecting the position of the magnetic member in the three axial directions with respect to the neutral position, wherein the return member is an elastic member.

11. The input device according to claim 1, further comprising:

an operation member that engages with the return member, the return member receiving a part of the operation member therein, wherein the return member allows the operation member to be pulled up in a vertical direction.

12. The input device according to claim 11, wherein the operation member movably supports the magnetic member at an inner side of the return member.

13. The input device according to claim 11, wherein the return member movably supports the magnetic member.

14. The input device according to claim 1, further comprising:

an operation member that engages with the return member, the return member receiving a part of the operation member therein, wherein the return member allows the operation member to rotate around a vertical axis thereof.

15. The input device according to claim 14, wherein the operation member movably supports the magnetic member at an inner side of the return member.

16. The input device according to claim 14, wherein the return member movably supports the magnetic member.

17. An electronic device including the input device of claim 2.

* * * * *